Jan. 16, 1951     N. J. PETERS     2,538,379

RECTANGULAR CHEESE HOOP

Filed March 4, 1948

INVENTOR.
Norman J. Peters
BY
Charles & French
ATTORNEYS

Patented Jan. 16, 1951

2,538,379

UNITED STATES PATENT OFFICE 2,538,379

RECTANGULAR CHEESE HOOP

Norman J. Peters, Fond du Lac, Wis., assignor to Damrow Brothers Company, Fond du Lac, Wis., a corporation of Wisconsin Application March 4, 1948, Serial No. 13,050

1 Claim. (Cl. 100—55.5)

The invention relates to rectangular cheese hoops.

Heretofore the sides of rectangular cheese hoops at their upper edges have been reinforced by having a double thickness, and the handles have been formed of separate metal parts welded to the sides of the hoop. The object of this invention is to eliminate the extra parts above described by flanging the greater portion of the length of the top portion of opposite sides of the hoop to provide a reinforced hoop and also at the same time form the handles for the hoop.

In the use of cheese hoops of the character above described a sleeve is supported by wires above the body of the hoop prior to the pressing operation, and another object of this invention is to provide a new and improved wire support for the sleeve which is easier to apply and remove than the separate wires usually employed.

The invention further consists in the several features hereinafter described and more particularly defined by claims at the conclusion hereof.

Figure 1:
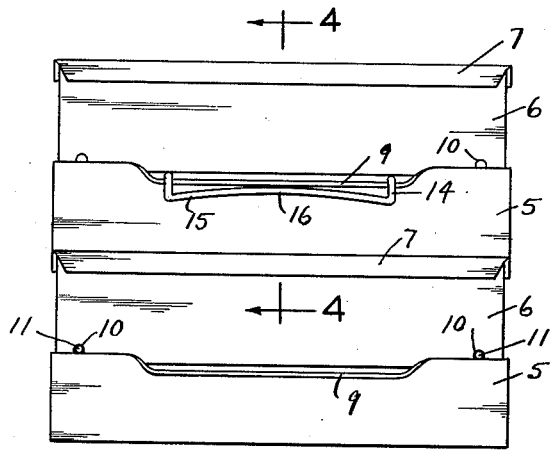
Fig. 1 is a side elevation view of several assembled cheese hoops embodying the invention.

Referring to the drawings, the numeral 5 designates generally cheese hoops embodying the invention, 6 the sleeves, and 7 the apertured covers provided with apertures 8a.

Figures 3, 4:
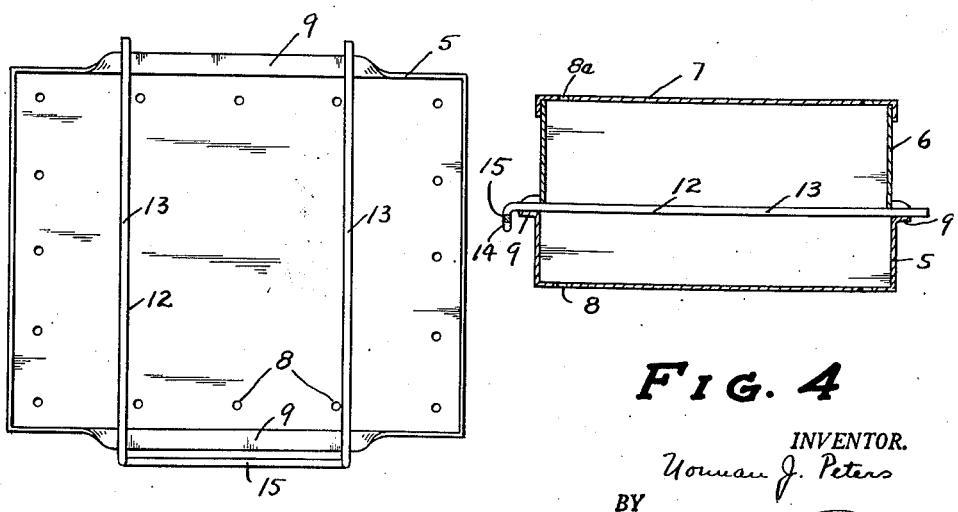
Fig. 3 is a plan view of one of the hoops and my improved sleeve support.
Fig. 4 is a detailed vertical sectional view taken on the line 4—4 of Fig. 1.

Each cheese hoop 5 is formed from a sheet of stainless steel pressed into the form of a rectangular box as shown in Fig. 4. These hoops are known to the trade as square hoops, but usually their sides are longer than their ends and they are generally used in conjunction with removable partitions (not shown) to produce cheese of square cross section. The bottoms of the boxes forming the hoops are provided with a series of drain holes 8.

It has been the practice heretofore to reinforce the sides of rectangular cheese hoops by doubling the thickness of their upper edge portions and also to provide separate metal handles welded to opposite sides of the box. This practice from the standpoint of both labor and material is expensive. According to the present invention all this labor and extra material has been eliminated by flanging down opposite sides of the box for a greater portion of their length to produce integral reinforcing side flanges 9, these flanges being of sufficient width so that they also act as handles for the hoop and to make a hoop which does not have crevices at these places which may be unsanitary.

It has also been the practice to provide sets of alined holes 10 in the sleeves 6 and to insert a temporary sleeve support wire 11 in each set of holes so that the ends of these wires project over the sides of the box or hoop to support the sleeve on the hoop while the cheese is being placed therein preparatory to pressing the same after which the wires are removed and with a top cover 7 on the sleeve, the cheese therein is forced into the hoop along with the sleeve until the bottom edge of the sleeve engages the bottom of the box or hoop.

According to the present invention instead of the usual two separate wires I may use as a temporary sleeve support, a wire support 12 of U-shaped form in which the legs 13 thereof are laid across the box or hoop so as to rest on the tops of the flanges 9 as shown in Figs. 3 and 4 and the parts 14 of the legs where they connect with the transverse or web portion 15 of the support are bent down so that the part 15 forms a handle which is perferably curved upwardly intermediate its ends as shown at 16 so as not to interfere when gripping the handle at the box itself. With this arrangement it is a simple matter to place the support 12 in sleeve supporting position and to remove it from beneath the same when necessary by grasping the handle 15 and drawing it outwardly.

Figure 2:
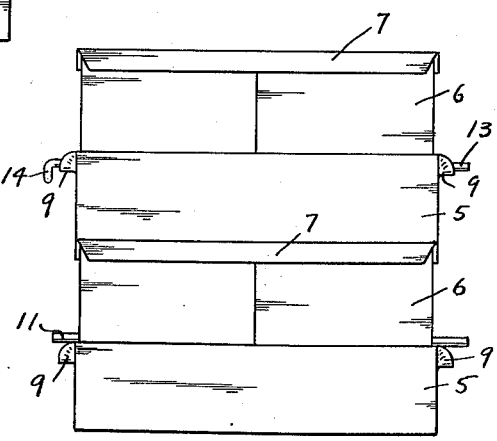
Fig. 2 is an end elevation view of the hoops shown in Fig. 1.

Prior to the pressing operation the loaded hoops can be arranged in stacked formation as shown in Figs. 1 and 2. The wire supports for the sleeves are removed before the hoops are inserted in the press.

I desire it to be understood that this invention is not to be limited to any particular form or arrangement of parts except insofar as such limitations are included in the claim.

What I claim as my invention is:

The combination of a rectangular cheese hoop having opposite side walls of the base thereof provided with flanges extending outwardly and depressed below the top edge of the walls providing oppositely positioned horizontal supports, and a U-shaped support having the bight of the U at an angle to the legs thereof, said last mentioned support resting on the flanges and the legs thereof being of a thickness less than the depth of the recess of the flange whereby the bight will constitute a stop for engaging with one flange and a handle to remove the support from the cheese hoop, thereby permitting a cheese hoop sleeve positioned on said last mentioned support to be moved within the confines of the cheese hoop base when the last mentioned support is removed.

NORMAN J. PETERS.

REFERENCES CITED

The following references are of record in the file of this patent:

UNITED STATES PATENTS

| Number | Name | Date |
| --- | --- | --- |
| 112,597 | Holdredge et al. | Mar. 14, 1871 |
| 534,906 | McLean | Feb. 26, 1895 |
| 1,287,206 | Brenzinger | Dec. 10, 1918 |
| 1,469,252 | Damrow | Oct. 2, 1923 |
| 1,709,030 | Manthei | Apr. 16, 1929 |
| 1,886,171 | Dodge et al. | Nov. 1, 1932 |